United States Patent [19]

Holmer et al.

[11] Patent Number: 5,092,051
[45] Date of Patent: Mar. 3, 1992

[54] ABSOLUTE-MEASURING POSITION TRANSDUCER SYSTEM FOR INDUSTRIAL ROBOT

[75] Inventors: Anders Holmer; Einar Myklebust, both of Västerås, Sweden

[73] Assignee: 501 Asea Brown Boveri AB, Västerås, Sweden

[21] Appl. No.: 547,235

[22] Filed: Jul. 3, 1990

[30] Foreign Application Priority Data

Jul. 4, 1989 [SE] Sweden .................. 8902416

[51] Int. Cl.$^5$ .................. G01B 7/30
[52] U.S. Cl. .................. 33/1 N; 33/1 PT; 318/568.24; 307/64
[58] Field of Search ............ 33/1 MP, 1 N, 1 PT; 307/64, 66, 67; 318/661, 568.24

[56] References Cited

U.S. PATENT DOCUMENTS

| | | | |
|---|---|---|---|
| 4,112,291 | 9/1978 | Fukuyama et al. | 318/603 |
| 4,575,666 | 3/1986 | Nakashima et al. | 318/661 |
| 4,638,234 | 1/1987 | Schroder et al. | 318/661 |
| 4,672,279 | 6/1987 | Hosokawa et al. | 307/67 |
| 4,676,002 | 6/1987 | Slocum | 33/1 MP |

FOREIGN PATENT DOCUMENTS

| | | |
|---|---|---|
| 0177901 | 4/1986 | European Pat. Off. |
| 3834384 | 4/1990 | Fed. Rep. of Germany ..... 33/1 PT |
| 0120903 | 6/1986 | Japan .................. 33/1 N |
| 8400028 | 10/1984 | Sweden . |

OTHER PUBLICATIONS

Control Engineering 30(1983): 5 May 1983, "Synchro and Microprocessor Combine for Versatile Multi-Turn Position Sensing", pp. 84-87.

Primary Examiner—William A. Cuchlinski, Jr.
Assistant Examiner—Alvin Wirthlin
Attorney, Agent, or Firm—Pollock, Vande Sande & Priddy

[57] ABSTRACT

An asbolute position-measuring transducer system for an industrial robot having a plurality of axes of movement comprises an individual position transducer in the form of a resolver for each one of the axes, with the operating range of each axis corresponding to a plurality of revolutions of its resolver, a revolution counter connected to the output of the resolver of at least one of the axes for receiving the output signals from the resolver and counting the accumulated number of resolver revolutions, a back-up battery adapted for supplying the resolver and the revolution counter during the power failure, and a device for effecting the intermittent operation and reading-off of the resolver during the battery back-up operation, whereby a single resolver is used for position measuring during the normal operation and for counting revolutions during the battery back-up operation.

10 Claims, 6 Drawing Sheets

ABSOLUTE-MEASURING POSITION TRANSDUCER SYSTEM FOR INDUSTRIAL ROBOT

TECHNICAL FIELD

The present invention relates to an absolute-measuring position transducer system for an industrial robot, which has a plurality of axes of movement with an individual position transducer in the form of a resolver for each one of the axes, the operating range of each axis corresponding to a plurality of revolutions of the resolver of the axis.

BACKGROUND OF THE INVENTION

It is previously known to use resolvers as position transducers in industrial robots. To achieve the desired high accuracy of the position value obtained with the aid of such a resolver, the resolver is usually arranged such that the operating range of the axis corresponds to a plurality of revolutions of the resolver. This can be achieved, for example, by mounting the resolver on the shaft of a motor which drives the robot axis through a gear. However, this solution has the drawback that the resolver signal does not give an unambiguous definition of the position of the axis, so that the equipment must be supplemented with electronic means in the form of counters, memories, and the like, which continuously check which resolver revolution the axis is at within the moment. These electronic means must be reset when putting a robot into service and thereafter after each voltage drop out or other switch-off of the voltage supply of the robot. These so-called synchronization operations require time and manual labor.

Therefore, it is desired to provide so-called absolute-position measuring transducer systems, that is systems which provide an unambiguous, and accurate, determination of the position of a robot axis without requiring any synchronization operations. It has been proposed to design such a system with two resolvers for each robot axis. One resolver is arranged so as to rotate a plurality of revolutions when the robot axis moves between the limits of its operating range, and it then makes possible an accurate determination of the position. The other resolver is arranged so as to rotate less than one revolution when the robot axis moves between the limits of its operating range, and with the aid of this resolver an unambiguous determination may be obtained as to within which revolution the first resolver is situated. Thus, by combining the output signals of the two resolvers, an unambiguous determination of the position of the robot axis may be obtained. However, this solution requires two resolvers per robot axis and is therefore complicated and expensive.

Prior art position transducer equipment using resolvers have been connected to a control system common to the robot axes, which system then comprises supply and sensing members for the resolvers. Since each resolver has three windings, an extensive cable arrangement between the resolvers and the control system is then required. Such a cable arrangement will be expensive and bulky. This is particularly the case with absolute position-measuring transducer systems having two resolvers per robot axis.

From EP-A-177 901 it is previously known to provide an absolute position-measuring transducer system for an industrial robot by arranging for each robot axis two transducers, such as a resolver and a pulse transducer with associated circuits for sensing the direction of movement and counting the total number of revolutions of the axis. In normal operation, the number of whole revolutions for each axis, obtained from the sensing circuits of the pulse transducer, is combined in a calculation circuit with the angular position within each revolution, which is obtained from the resolver of the same axis. In case of drop out of the supply voltage, the pulse transducer with associated reading circuits is supplied by a battery and stores a value which correctly indicates the number of whole revolutions of the axis independently of movements of the robot during the voltage drop out. The pulse transducer may be fed from an oscillator with a low on/off ratio for reduction of the power consumption during the battery supply interval. Thus, in this known system, the resolver with its high current consumption is not used during the battery feed interval, but the resolver is supplemented with another type of position transducer, a pulse transducer, which itself has a low power consumption. In the system known from EP-A 177 901, there are thus required for each axis a resolver and a pulse transducer with associated sensing and storage circuits. A typical industrial robot has six axes, and the absolute-measuring function is thus obtained at the cost of a considerable complication and increase in price of the robot.

SUMMARY OF THE INVENTION

The present invention aims to provide an absolute position-measuring transducer system of the kind mentioned above, in which both the transducer units and the required cable arrangement may be designed in the simplest possible manner, thus considerably reducing the cost of the position transducer system.

This is achieved, according to the invention, by using the same transducer, namely the resolver, both during normal operation and for checking the number of revolutions of the axes during battery operation. This results in a considerable cost saving and a reduction of the complexity of the system as compared with the prior art systems described above in which for each axis the resolver must be supplemented with an additional transducer, for example an additional resolver or a pulse transducer, with its sensing circuits. The current consumption of a resolver, which by itself is high and which is the reason for the above-mentioned known solution with an additional a pulse transducer with its low current consumption, for each axis, is reduced according to the invention, by the novel pulsed feeding of the resolver during battery operation, to such low values that the battery operation may be maintained also during long interruptions of the normal current supply.

DESCRIPTION OF THE PREFERRED EMBODIMENTS

Figure 1:
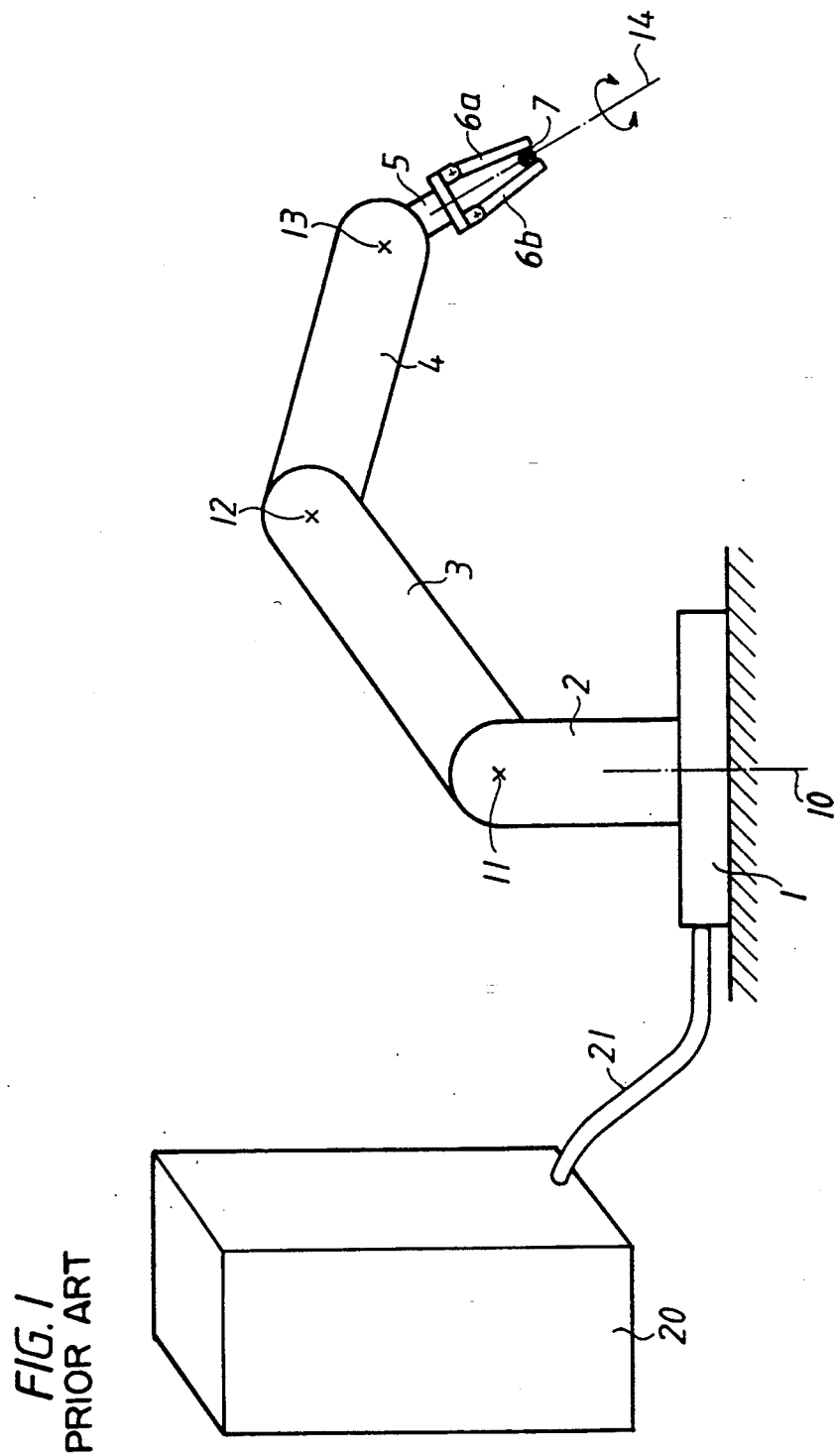
FIG. 1 shows a known industrial robot.

FIG. 1 schematically shows a known industrial robot. It has a base plate 1 mounted on a foundation, a lower part 2 which is rotatable around an axis 10 perpendicular to the base plate, a lower arm 3 which is rotatable around an axis 11 perpendicular to the plane of the paper, an upper arm 4 which is rotatable in relation to the lower arm around an axis 12 perpendicular to the plane of the paper, and a hand 5 which is rotatable in relation to the upper arm around an axis 13 perpendicular to the plane of the paper. The robot hand 5 supports a tool, for example the gripping device with jaws 6a and 6b, shown in FIG. 1, for gripping an object 7. The tool is rotatable in relation to the robot hand 5 around an axis 14. Thus, the robot has five axes of movement, each one with a drive motor and with position transducers for sensing the current rotational angle in each axis. The robot has a control system 20 which is connected to the actual robot with the aid of a cable 21. The control system generates, in a known manner, desired position values for the various axes based on a program stored into the control system, compares these desired values with the actual position values for the various axes and generates, in dependence thereon, control signals for the drive motors of the axes.

Figure 2:
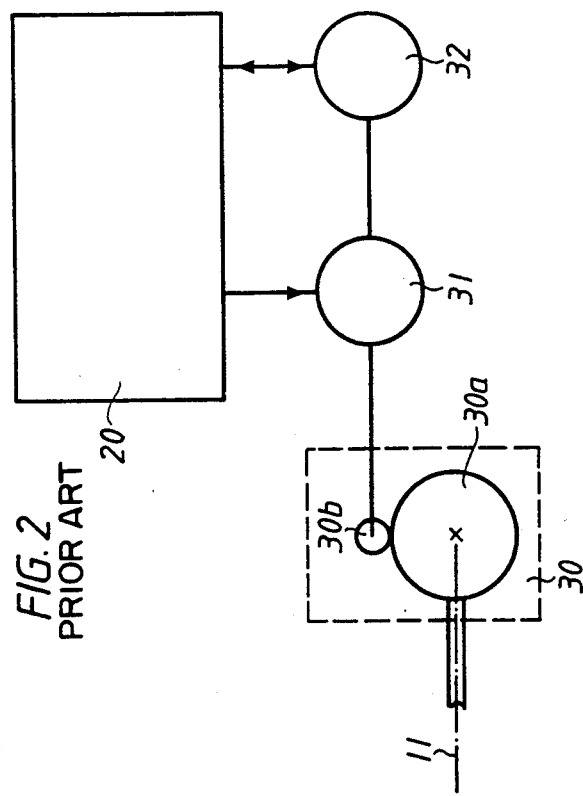
FIG. 2 shows a known transducer system with a resolver.

FIG. 2 shows how, in a known manner, the drive and position sensing system may be designed for one of the axes of movement of the robot, namely, the axis 11. The drive motor 31 of the axis is connected to the robot axis via a gear 30, for example a gear reduction set with the gear wheels 30a and 30b. The drive motor is supplied from the control system 20 of the robot. A resolver 32 is mechanically connected to the motor shaft for sensing the shaft position. The resolver is fed from the control system 20, and its two sensing windings are connected to the control system, which in a known manner, in dependence on the voltages induced in the sensing windings of the resolver, generates a signal corresponding to the rotational angle of the resolver. In a system of this known type, the cable arrangement is extensive, since each one of the three windings of each resolver must be connected to the control system 20. Further, the system shown in FIG. 2 is not absolute-measuring system and therefore, as mentioned in the introduction, a manual synchronization operation is required when putting the robot into operation and after each power failure. In a known position transducer system of an absolute-measuring type with two resolvers for each robot axis, the cable arrangement is still more complicated.

Figure 3:
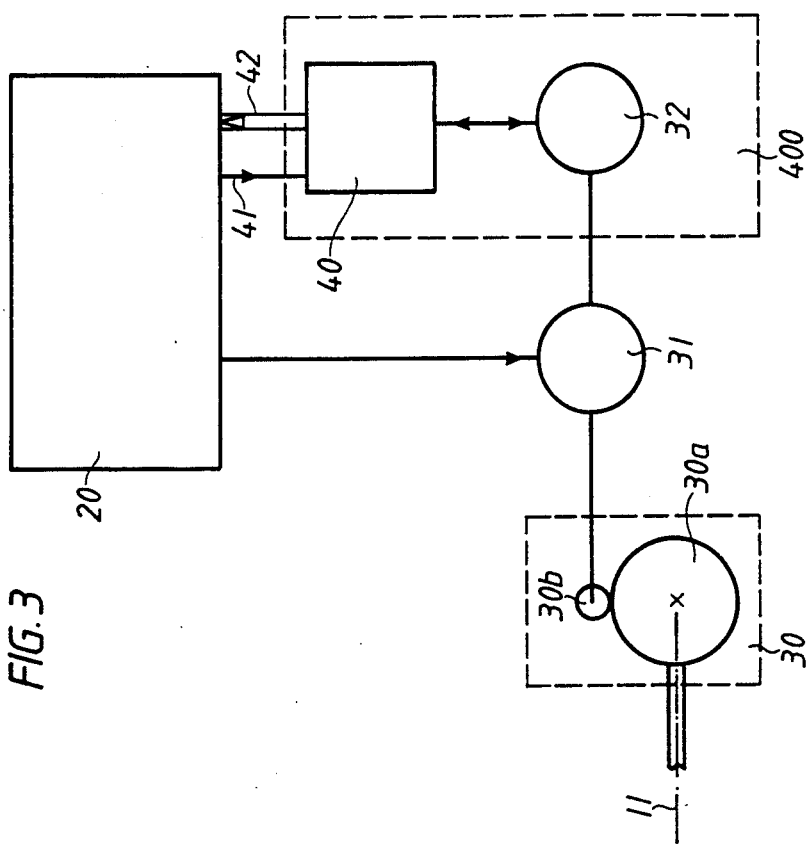
FIG. 3 shows how, according to the present invention, a position transducer unit is connected to the robot axis and to a common control system.

FIG. 3 shows that part of a position transducer system according to the invention which belongs to a robot axis (axis 11). Each axis has an axis unit 400 comprising a resolver 32, connected to the shaft of the drive motor, and an electronic unit 40 for supplying the resolver and for processing of the output signals of the resolver. The latter are converted in the electronic unit into a digital signal which is supplied to the control system 20 via a data line 42. The control system delivers to each one of the axis units a supply voltage via a line 41.

Figure 4:
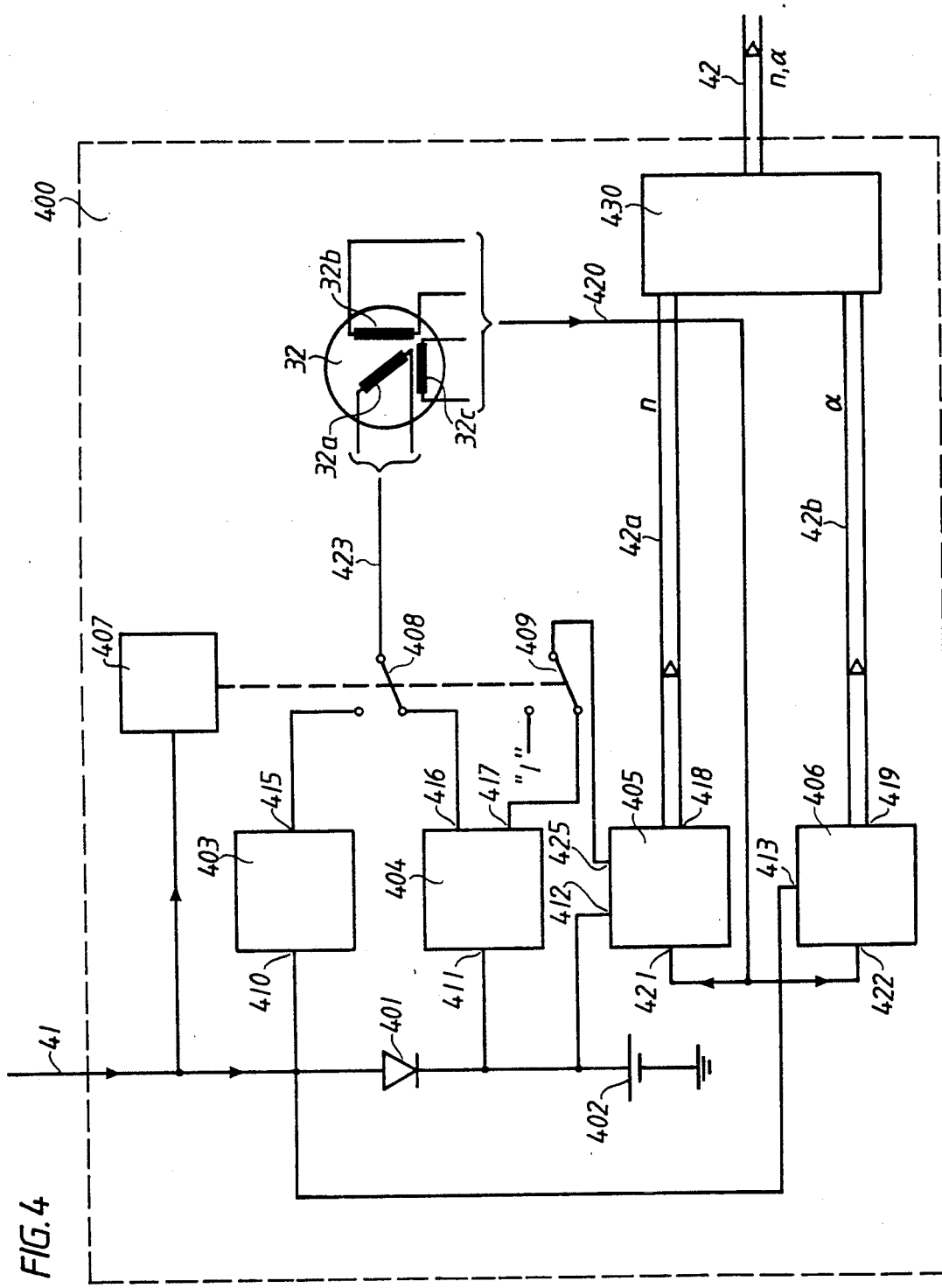
FIG. 4 shows an example of the design of the position transducer unit for one of the robot axes.

FIG. 4 shows an example of the design of the axis unit 400 in FIG. 3. The unit comprises an oscillator 403 for continuous supply of the resolver, an oscillator 404 for pulsed supply of the resolver, a revolution counter 405, an R/D convertor 406, and a voltage-sensing relay 407. The supply input 410 of the oscillator 403 and the supply input 413 of the R/D convertor 406 are directly connected to the supply line 41 from the control system 20. The supply inputs 411 and 421 of the oscillator 404 and the revolution counter 405 are connected to an accumulator battery 402, which via a diode 401 is connected to the supply line 41.

During normal operation, all four units 403–406 receive supply voltage from the line 41 and are in operation. The necessary charge or compensating charge of the battery 402 may then suitably be made with the aid of a battery charger, not shown in FIG. 4. The relay 407, which senses the supply voltage, is activated and then connects the output 415 of the oscillator 403 via the contact 408 and the line 423 to the excitation winding 32a of the resolver. At the same time, a signal corresponding to a logical "one" is connected via the relay contact 409 to the synchronization input 425 of the revolution counter 405.

In case of a drop out of the supply voltage from the control system, the relay 407 falls and its contacts 408 and 409 assume the position shown in FIG. 4. The oscillator 403 and the R/D convertor 406 do not receive supply voltage and stop working. The oscillator 404 and the revolution counter 405, on the other hand, do receive supply voltage from the battery 402. The output 416 of the oscillator 404 is connected via the contact 408 to the excitation winding of the resolver. From a synchronization output 417 on the oscillator 404 a synchronization signal is connected via the contact 409 to the synchronization input 425 of the revolution counter 405.

The two sensing windings 32b and 32c of the resolver 32 are connected, via lines 420, to the signal input 421 of the revolution counter and the signal input 422 of the R/D convertor. From the revolution counter 405 a digital signal n is obtained on the output 418 which is supplied via the data line 42a to a communication unit 430 and which indicates within which quadrant the resolver is. From the output 419 of the R/D convertor 406 there is obtained, (during normal operations) a digital signal α which indicates the rotational angle of the resolver, within the revolution or within the quadrant in question, and which, via the data line 42b, is supplied to the communication unit 430. This unit handles the digital communication with the control system 20 via the bus 42 and forwards measured values n and α to the control system.

The oscillator 403 delivers, as long as supply voltage is present on the line 41, a sinusoidal or square alternating voltage with a frequency which may be 2-20 KHz. The oscillator 404 delivers on its output 416 an alternating voltage of the same type and the same frequency as the output signal from the oscillator 403. However, the oscillator 404 operates in pulsed operation, such that it delivers a short output signal, for example one or a few periods of the alternating voltage followed by a lengthy pause, for example for 2-3 ms. From the output 417 of the oscillator there is obtained a synchronization signal which is a logical "one" during the brief interval when the oscillator delivers an output signal and which is a logical "zero" during the pauses between these intervals.

During normal operation in the presence of supply voltage on the line 41 the relay 407 is activated, the resolver 32 is supplied continuously from the oscillator 403, the revolution counter 405 is continuously activated by supplying a logical "one" to its synchronization input 455 and the R/D convertor 406 is in operation. By the combination of the output signals of the revolution counter and the R/D convertor, a quantity can be formed in a simple manner, which within the entire operating range of the robot axis accurately indicates the current axis position. Provided that the output signal n of the revolution counter indicates the number of quadrants (one-fourth of a revolution) that the resolver has rotated from a reference position, the actual position value of the axis is obtained:

$$\phi = n \times \pi/2 + \alpha \text{ radians.}$$

In the event of drop out of the supply voltage on the line 41, only the oscillator 404 and the revolution counter 405 are working. Since both this oscillator and the revolution counter are working in pulsed operation, they may be designed with a very low power consumption, and their operation is therefore ensured with the aid of the accumulator battery 402 also for very long periods of drop out of supply voltage.

Figure 5:
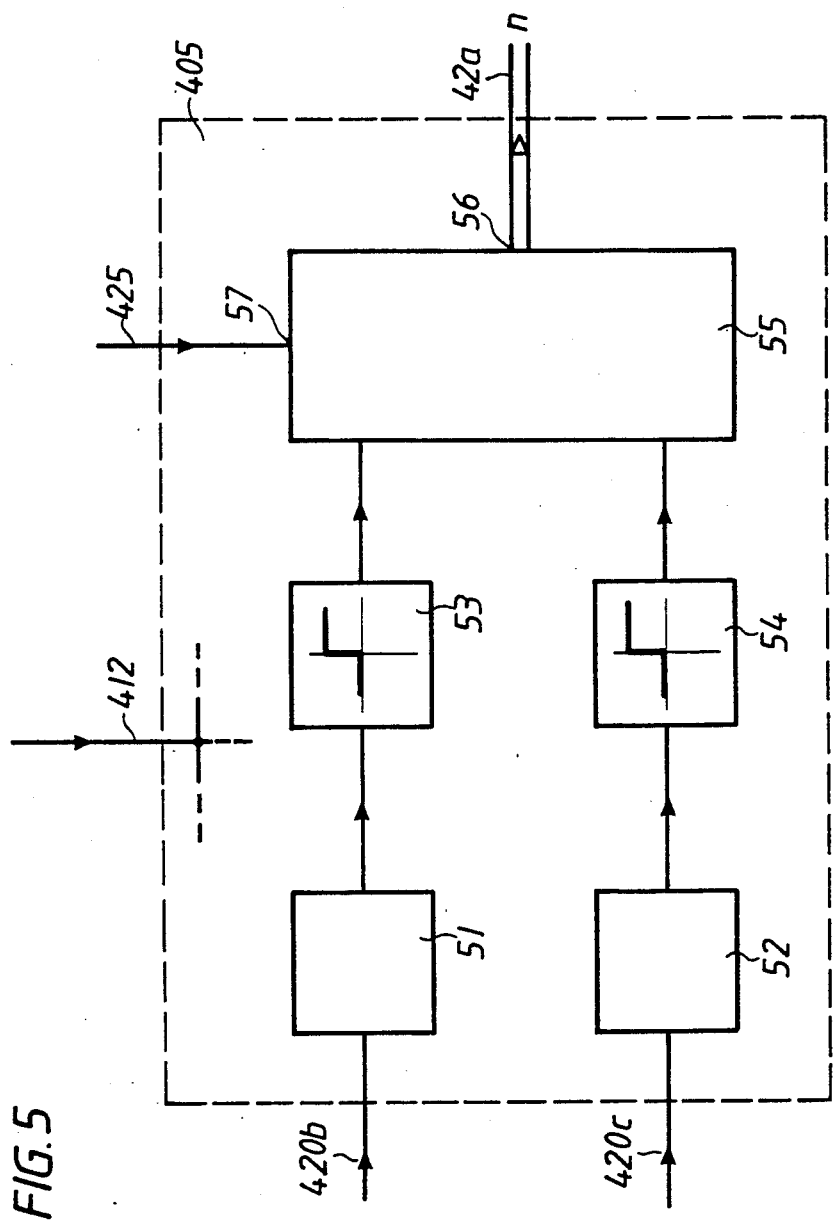
FIG. 5 shows how the revolution counter, included in the position transducer unit, can be designed.

FIG. 5 shows the design of the revolution counter 405. The resolver signals from the windings 32b and 32c arrive at the revolution counter on the lines 420b and 420c. The signals are supplied to amplitude detectors 51 and 52. From each one of these detectors, an output signal is obtained which constitutes a measure of the amplitude of the respective resolver signal, which consists of an alternating voltage with the same frequency as the supply voltage of the resolver. The amplitude signals are supplied to level detectors 53 and 54, each of which delivers a logical "one" if the incoming signal is positive and a logical "zero" if the input signal is negative. The amplitude detectors are phase-sensitive with the oscillator signal as reference value and their output signal may thus vary between a positive and a negative maximum value. The output signals of the level detectors are supplied to inputs of a reversible counter 55. Upon rotation of the resolver, the output signals of the two level detectors will be 90° offset in phase relative to each other, and the counter determines in a known manner the direction of rotation and hence the direction of counting on the basis of the sign of the phase difference between the two level detector signals. The combination of input signals to the counter changes upon every 90th degree of the rotation of the resolver, the counter counting up or down one unit, depending on the direction of rotation of the resolver. The contents of the counter are thus proportional to the number of quadrants or revolutions that the resolver has rotated relative to a reference position. The contents of the counter are obtained on the output 56 of the counter as a digital number n. The input 412 of the revolution counter is supplied with supply voltage from the accumulator battery 402, which supply voltage is supplied to the different units of the revolution counter. To ensure a correct function, the counter 55 is activated only during the working interval of the oscillator 404. This is achieved by supplying, during these intervals, the synchronization signal from the oscillator to the so-called count-enable input 57 of the counter.

During an interruption of the operation of the robot, for example because of a power failure, the contents of the counter 55 will always provide a correct indication of the position of the robot axis to indicate within which of the quadrants of the resolver the position is at the moment independently of any changes of the axis position during the interruption of the operation. As soon as normal operation is resumed and the axis unit receives supply voltage via the line 41, the axis unit will resume its normal operation without the need of any synchronization operations.

Figure 6A:
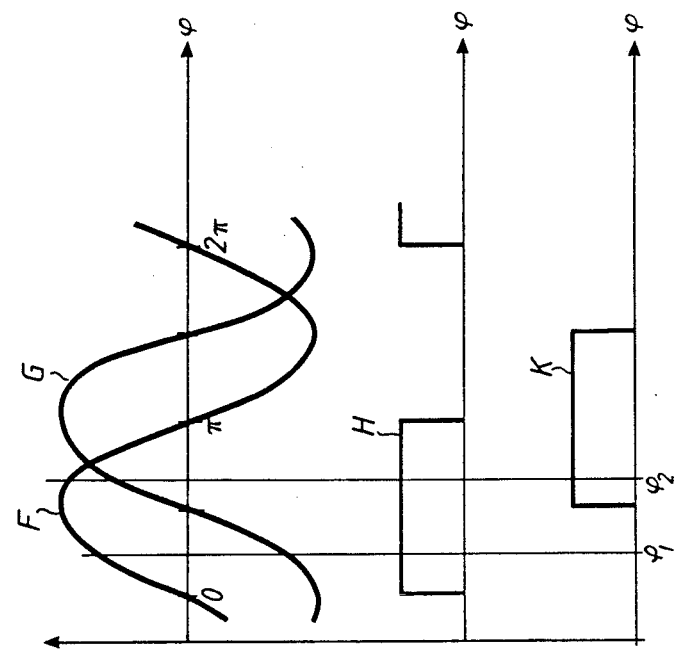
FIGS. 6a, 6b and 6c show some of the signals occurring in the equipment according to FIGS. 4 and 5.

In FIG. 6a the curve A shows the supply voltage from the oscillator 403 to the resolver winding 32a as a function of time. The position of the resolver is assumed to correspond to the rotational angle $\phi 1$ in FIG. 6b. The output signal B from the amplitude detector 51 then has the value a and the output signal C from the detector 52 the value b. The output signal D of the level detector 53 is a logical "one" and the output signal E of the detector 54 is a logical "zero". FIG. 6a shows the signals during normal operation, when the supply voltage is obtained on the line 41.

Figure 6C:
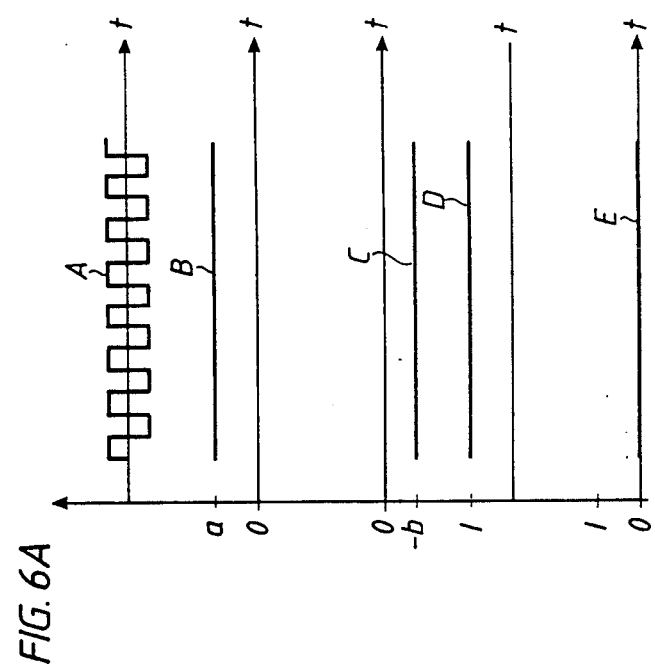
Figure 6B:
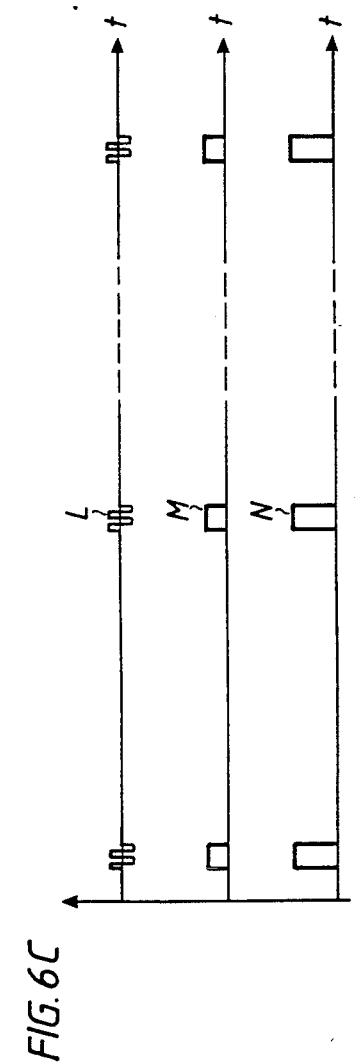

FIG. 6b shows, at the top, the output signals F and G of the amplitude detectors 51 and 52 as a function of the rotational angle $\phi$ of the resolver. Below this are shown the output signals H from the level detector 53 and K from the level detector 54. At the resolver angle $\phi 1$ the signals from the level detectors have the values 1 and 0, respectively. If the resolver is rotated so that the resolver angle comes within the next quadrant, for example at $\phi = \phi 2$, the output signal of the detector 54 is changed to a logical "one", whereupon the counter 55 counts up one unit.

FIG. 6c shows at the top the output voltage L of the oscillator 404 in case of drop out of the supply voltage to the axis unit. The output signal consists of short intervals, for example a few tens or a few hundreds of $\mu$s, during which the oscillator delivers its alternating voltage output signal to the supply winding 32a of the resolver. During the intermediate period, which may have a duration of, for example, 2-3 ms, the oscillator is inactive. The curve M shows the synchronization signal delivered from the output 417 of the oscillator 404 to the revolution counter. The curve N shows the amplitude of the output signal from one of the resolver windings.

Figure 7:
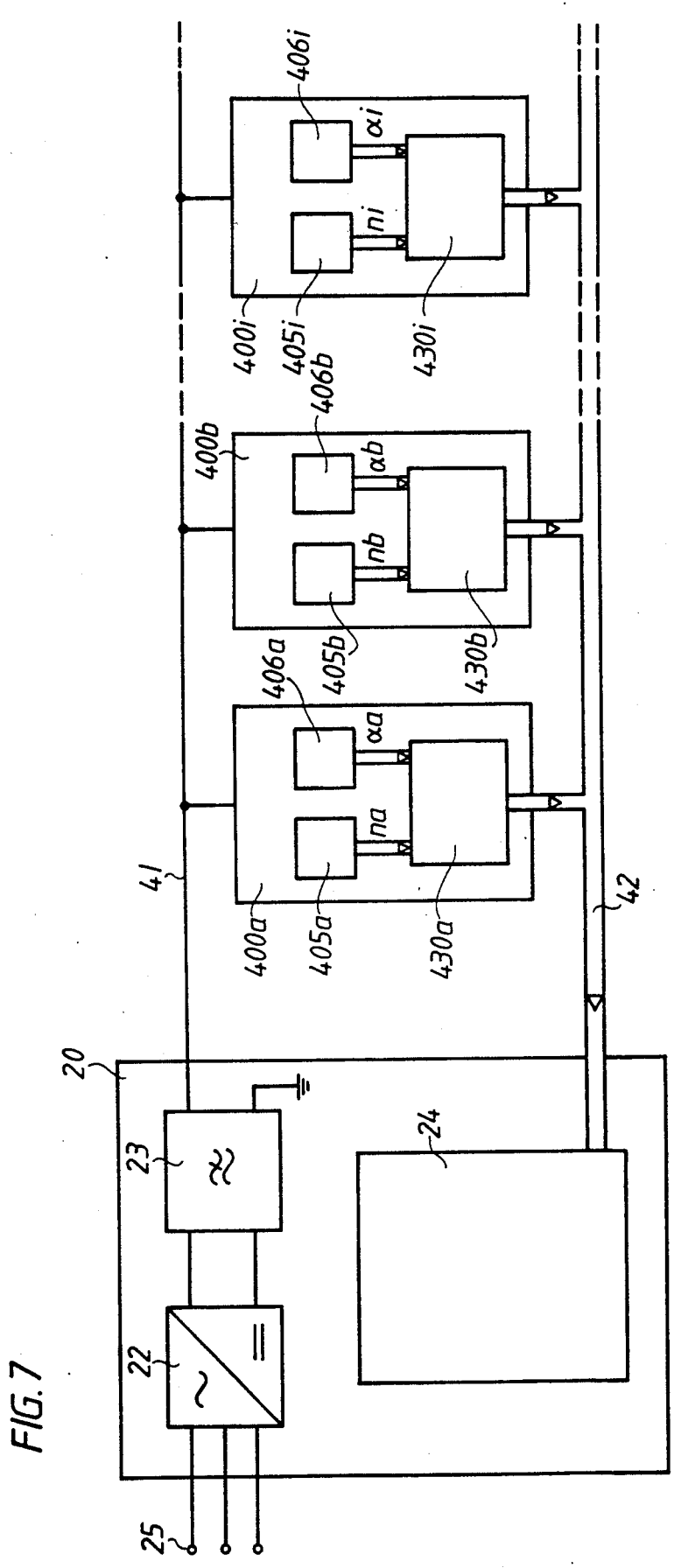
FIG. 7 shows how the position transducer units for the various robot axes are connected to the common control system in a position transducer system according to the invention.

FIG. 7 shows how the axis units are connected to the central common control system 20. This comprises a rectifier 22 with terminals 25 for connection to an alternating voltage network, and delivers the supply direct voltage on the line 41 via a smoothing filter 23. The control system 20 further comprises a computer system 24, which via a digital series bus 42 communicates with and receives actual position values from the various axis units 400a, 400b . . . 400i. The system has one axis unit for each robot axis. Each axis unit comprises the units shown in FIG. 4, a resolver with associated supply and sensing members and an accumulator battery. Each axis unit is mounted adjacent to an associated robot axis, with the electronic units and the accumulator battery built together with the resolver into one single transducer unit, or with these units arranged in immediate proximity to the resolver. Of the various axis units, for the sake of clarity only the revolution counters 405a . . . 405i, the R/D convertors 406a . . . 406i, and the communication units 430a, 430b . . . 430i are shown. The revolution counters deliver, via the communication units and the series bus 42, the signals na, nb . . . ni to the computer 24. The R/D convertors deliver, via the communication units and the series bus, the signals $\alpha a$, $\alpha b$ . . . $\alpha i$ to the computer. On the basis of these signals, the computer forms, in the manner stated above, the actual position values for each robot axis, compares these values with programmed or manually entered desired position values and, in dependence on these comparisons, controls the drive motors of the axes.

The position transducer system described above constitutes only an example of a system according to the invention, and such a system may be designed in a great many alternative ways within the scope of the invention. Thus, for example, instead of an accumulator battery in each axis unit, one single accumulator battery may be arranged centrally in the control system 20 or in the robot 1. Further, instead of the two oscillators 403 and 404 in FIG. 4, one single oscillator may be used, which operates continuously during normal operation and is switched to pulsed operation in case of drop out of the supply voltage. Also, the mechanical coupling of the resolver to the motor shaft may be carried out in ways other than that described above. The described sensing of the supply voltage drop out with the aid of voltage sensing members arranged in each axis unit may be replaced by a central sensing operation, carried out in the control cabinet 20, signals for switching of the axis units to pulsed operation then being transmitted to these from the control cabinet.

We claim:

1. An absolute position-measuring transducer system for an industrial robot, which has a plurality of axes of movement, said transducer system comprising:
   an individual position transducer in the form of a single resolver for each one of the axes, with the operating range of each axis corresponding to a plurality of revolutions of its resolver;
   a revolution counter connected to the output of the resolver of at least one of the axes for receiving output signals from the resolver and counting an accumulated number of resolver revolutions;
   a back-up battery adapted for supplying the resolver and the revolution counter during power failure; and
   means for effecting intermittent operation and reading-off of the resolver during operation of the back-up battery, whereby said single resolver is used for position measuring during normal on line operation and for counting revolutions during the back-up battery operation.

2. A position-measuring transducer system according to claim 1, comprising digitizing means connected between the resolver and the revolution counter for digitizing the output signals of the resolver for sensing the resolver position.

3. A position-measuring transducer system according to claim 2, further comprising means connected to the resolver which are adapted for on-line continuous supply and reading off of the resolver; first power supply means for supplying power during normal operation of the mans for continuous supply and reading off of the resolver, and activating means for activating said means for effecting intermittent operation of the resolver in case of drop out of the supply from said first power supply means.

4. A position-measuring transducer system according to claim 1, further comprising means connected to the resolver which are adapted for on-line continuous supply and reading off of the resolver; first power supply means for supplying power during normal operation of the means for continuous supply and reading off of the resolver, and activating means for activating said means for effecting intermittent operation of the resolver in case of drop out of the supply from said first power supply means.

5. A position-measuring transducer system according to claim 4, wherein a separate battery is provided for each axis which, together with said means for supply and reading-off of the resolver of the axis, form a separate axis unit mounted adjacent to the resolver of each axis.

6. A position-measuring transducer system according to claim 5, wherein a common means is provided for power supply for the axis units during normal operation.

7. A position-measuring transducer system according to claim 5, wherein the axis units are adapted to deliver position signals in a binary series form via a common series bus to a control system common to the axes.

8. A position-measuring transducer system according to claim 4, wherein the battery is common to a plurality of axes.

9. A position-measuring transducer system according to claim 1, wherein said back-up battery is common to a plurality of axes.

10. An absolute position-measuring transducer system for an industrial robot, which has a plurality of axes of movement, with said transducer system comprising:
    an individual position transducer in the form of a single resolver for each of the axes, and with the operating range of each axis corresponding to a plurality of revolutions of its resolver;
    at least one of said axes being provided with a first, on-line, position detecting means, said detecting means being supplied with the output signals from said resolver and being used during a normal operation of the system;
    a second, intermittent, position detecting means, provided in the same axis and supplied with the output signals from said single resolver;
    a back-up battery provided for supply of said resolver and said second position detecting means during normal operation power failure; and
    means adapted, during operation of said back-up battery for effecting intermittent position detection of said single resolver using said second position detecting means.

* * * * *